US010114619B2

(12) United States Patent
Nayak et al.

(10) Patent No.: US 10,114,619 B2
(45) Date of Patent: Oct. 30, 2018

(54) INTEGRATED DEVELOPMENT ENVIRONMENT WITH MULTIPLE EDITORS

(71) Applicant: SAP SE, Walldorf (DE)

(72) Inventors: Shiva Prasad Nayak, Bangalore (IN); Ashudeep Reshi, Bangalore (IN); Rishul Matta, Bangalore (IN); Indeevar Reddy Aduri, Bangalore (IN); Pradeep Panda, Sambalpur (IN); Makesh Balasubramanian, Bangalore (IN); Ashwin Vijayendra, Bangalore (IN); Poornesh Bharathipura Sharma, Bangalore (IN); Sudhansu Mohanty, Orissa (IN); Joseph Ashok Kumar, Bangalore (IN); Sai Harish Balantrapu, Hyderabad (IN)

(73) Assignee: SAP SE, Walldorf (DE)

( * ) Notice: Subject to any disclaimer, the term of this patent is extended or adjusted under 35 U.S.C. 154(b) by 433 days.

(21) Appl. No.: 14/864,866

(22) Filed: Sep. 25, 2015

(65) Prior Publication Data
US 2017/0039040 A1 Feb. 9, 2017

(30) Foreign Application Priority Data
Aug. 6, 2015 (IN) .......................... 4084/CHE/2015

(51) Int. Cl.
*G06F 9/44* (2018.01)
*G06F 8/35* (2018.01)
*G06F 8/34* (2018.01)
*G06Q 10/00* (2012.01)

(52) U.S. Cl.
CPC .................. *G06F 8/35* (2013.01); *G06F 8/34* (2013.01); *G06Q 10/00* (2013.01)

(58) Field of Classification Search
CPC ..... G06F 8/33; G06F 8/34; G06F 8/35; G06F 8/427; G06Q 10/00
USPC ................................ 717/105, 109, 113, 125
See application file for complete search history.

(56) References Cited

U.S. PATENT DOCUMENTS

| 9,367,435 | B2 * | 6/2016 | Sinyagin | G06F 11/3684 |
|---|---|---|---|---|
| 9,396,091 | B2 * | 7/2016 | Bally | H04L 67/16 |
| 9,740,462 | B2 * | 8/2017 | Rao | G06F 8/33 |
| 2006/0101406 | A1 * | 5/2006 | Goenka | G06F 11/3664 |
| | | | | 717/124 |

(Continued)

*Primary Examiner* — Marina Lee
(74) *Attorney, Agent, or Firm* — Buckley, Maschoff & Talwalkar LLC

(57) ABSTRACT

Methods and system are disclosed that improve a user experience to develop a data model. In one aspect, an entity model extensible markup language (EDMX) file is received by an integrated development environment (IDE). The contents of the EDMX file including elements, attributes and attribute values are displayed via a text editor of the IDE. Based on an input received to modify the attributes or the attribute values via the text editor, the graphical model may be instantiated to generate and display the modified attributes or attribute values in an ER editor. Based on an input received to modify the attributes or the attribute values on the ER editor, a text editor model may be instantiated to display the modified attributes or the attribute values in the text editor. The IDE improves the user experience to model and develop data models.

20 Claims, 8 Drawing Sheets

(56) References Cited

U.S. PATENT DOCUMENTS

| | | | | |
|---|---|---|---|---|
| 2010/0228683 A1* | 9/2010 | Ansley | ............................ | G06F 8/00 |
| | | | | 705/348 |
| 2010/0235275 A1* | 9/2010 | Ansley | ............................ | G06F 8/34 |
| | | | | 705/39 |
| 2010/0293080 A1* | 11/2010 | Shah | ............................ | G06F 8/34 |
| | | | | 705/34 |
| 2010/0293522 A1* | 11/2010 | Cifra | ............................ | G06F 8/34 |
| | | | | 717/105 |
| 2010/0313182 A1* | 12/2010 | Chen | ............................ | G06F 8/38 |
| | | | | 717/109 |
| 2011/0055744 A1* | 3/2011 | Ryan | ............................ | G06F 8/10 |
| | | | | 715/769 |
| 2011/0302556 A1* | 12/2011 | Drukman | ............................ | G06F 8/33 |
| | | | | 717/113 |
| 2012/0047483 A1* | 2/2012 | Amit | ............................ | G06F 17/30861 |
| | | | | 717/104 |
| 2013/0144878 A1* | 6/2013 | James | ............................ | G06F 17/30997 |
| | | | | 707/736 |
| 2014/0129457 A1* | 5/2014 | Peeler | ............................ | G06Q 10/067 |
| | | | | 705/317 |
| 2015/0142781 A1* | 5/2015 | Nigam | ............................ | G06F 17/30557 |
| | | | | 707/722 |
| 2016/0062745 A1* | 3/2016 | Rao | ............................ | G06F 8/33 |
| | | | | 717/109 |
| 2016/0092344 A1* | 3/2016 | Bally | ............................ | H04L 67/16 |
| | | | | 717/124 |
| 2017/0039040 A1* | 2/2017 | Nayak | ............................ | G06F 8/35 |
| 2017/0147928 A1* | 5/2017 | Vijayendra | ............................ | G06N 5/04 |
| 2018/0131556 A1* | 5/2018 | Band | ............................ | H04L 41/0273 |

\* cited by examiner

FIG. 6

INTEGRATED DEVELOPMENT ENVIRONMENT WITH MULTIPLE EDITORS

RELATED APPLICATIONS

This application claims priority from Indian Provisional Patent Application No 4084/CHE/2015, filed on Aug. 6, 2015, in the Indian Patent Office, the disclosures of which are incorporated herein by reference in their entireties.

BACKGROUND

Software applications may be developed through a process of software development, in a planned and structured way. The process of software development may include executing operations like computer programming, documentation, testing, bug fixing, etc. Typically, the computer programming may include executing tasks like writing code, compiling code, debugging code, etc. In a distributed programming environment, the above tasks may be executed using separate applications. Hence, executing such tasks using separate applications makes the process of software development cumbersome and complex. Therefore, providing an integrated development environment that improves a user experience for modeling and developing the software application, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 6 is a block diagram illustrating a text editor associated with the IDE, according to an embodiment.

DETAILED DESCRIPTION

Embodiments of techniques related to integrated development environment with multiple editors are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

An Integrated Development Environment (IDE) may correspond to a software application that may facilitate development of other software applications. The IDE may provide an integration of source code editor, debuggers, automation tools, data structure browsing, user interface engines, data models, model editors, graphical editors, text editors, source code version control, etc. The IDE may also include features like intelligent code completion (e.g., IntelliSense) based on a determination of context of programming environments. In an embodiment, the intelligent code completion feature may determine multiple programming languages, and provide suggestions for completing code. Such features may optimize the process of software development. In an embodiment, a software developer using such IDEs may execute operations (e.g., developing data models, validating data models, instantiating models, etc.) without using separate software applications. The multiple editors (e.g., model editors, text editors, graphical editors, etc.), models, debuggers, automation tools, features, etc., may be integrated and implemented as software components that may work in cooperation with each other.

In an embodiment, a software component may correspond to set of instructions or program code that may be reused based on definition and implementation. Based on executed operations, the cooperation between the software components may facilitate instantiation of models, user interface engines, etc., and may improve a user experience for developing the software applications and the data models. Additionally, the IDEs may facilitate context based visual programming, where software applications may be developed by arranging programming building blocks or code that may generate flowchart and structure diagrams.

Figure 1:
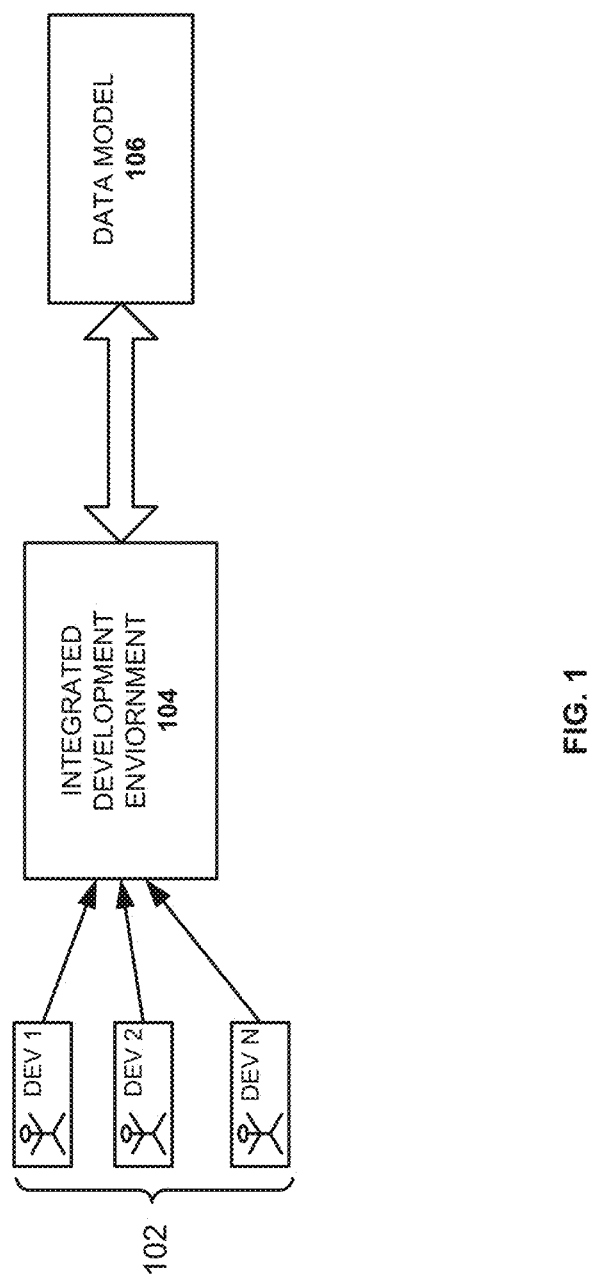
FIG. 1 is a block diagram illustrating an environment including integrated development environment to develop a data model, according to an embodiment.

FIG. 1 is a block diagram illustrating an environment including integrated development environment 104 to develop a data model, according to an embodiment. By way of illustration, FIG. 1 shows integrated development environment (IDE) 104 that can be used to model and develop a data model 106. In an embodiment, multiple developers 102 (e.g., DEV 1, DEV 2, . . . , DEV N) may connect to IDE 104 via web browsers (not shown). The IDE 104 may include an integration of user interface engines, models (e.g., text editor model, graphical model, annotations model, etc.), editors (e.g., text editor, ER Model editor, graphical viewer/editor, annotation editor, documentation editor, etc.), test client (e.g., for simulating or creating mock service and generate sample data preview), etc. The components (e.g., models, editors, user interface engines, etc.) of IDE 104 may be configured to work in cooperation with each other.

In an embodiment, multiple developers 102 may connect to IDE 104 over a network via web browsers. The developers or users may model and develop data models, software applications, etc., using IDE 104. In an embodiment, the data models may include elements (e.g., entities), attributes associated with the entities, attribute values, navigation information, etc. The data model 106 may be created as a data file (e.g., an Entity Data Model) including the above elements, attributes, attribute values, etc. The content of the data file may be viewed or modified using an editor (e.g., text editor) associated with IDE 104. An entity-relationship (ER) model or ER diagram may be generated from the data file. The ER model or ER diagram may show the relationships between the entities, attributes, attribute values, etc. The ER model or ER diagram may be generated by instantiating a graphical model associated with the IDE 104. The ER model or ER diagram may be rendered via a graphical viewer associated with IDE 104.

In an embodiment, the text editor may be configured to receive inputs (e.g., add, delete, modify elements, attributes, attribute values, etc.). Upon receiving such inputs, a text editor model associated with IDE 104 may instantiate graphical model associated with IDE 104 and propagate the modifications in the ER model or ER diagram. In an embodiment, the ER model or ER diagram rendered via the graphical viewer may be configured to receive inputs (e.g., modify attributes, attribute values, etc.). Upon receiving the inputs, the graphical model may instantiate the text editor model associated with IDE 104 and propagate the modifications in the text editor. In an embodiment, the text editor model and the graphical viewer may be instantiated and rendered side-by-side on a user interface. Such an interface may improve user experience to model and develop the data model. In an embodiment, multiple editors (e.g., text editor, graphical viewer/editor, annotation editor, documentation editor, etc.) frilly be rendered side-by-side on the user interface, thereby improving the user experience to model and develop the data model.

Figure 2:
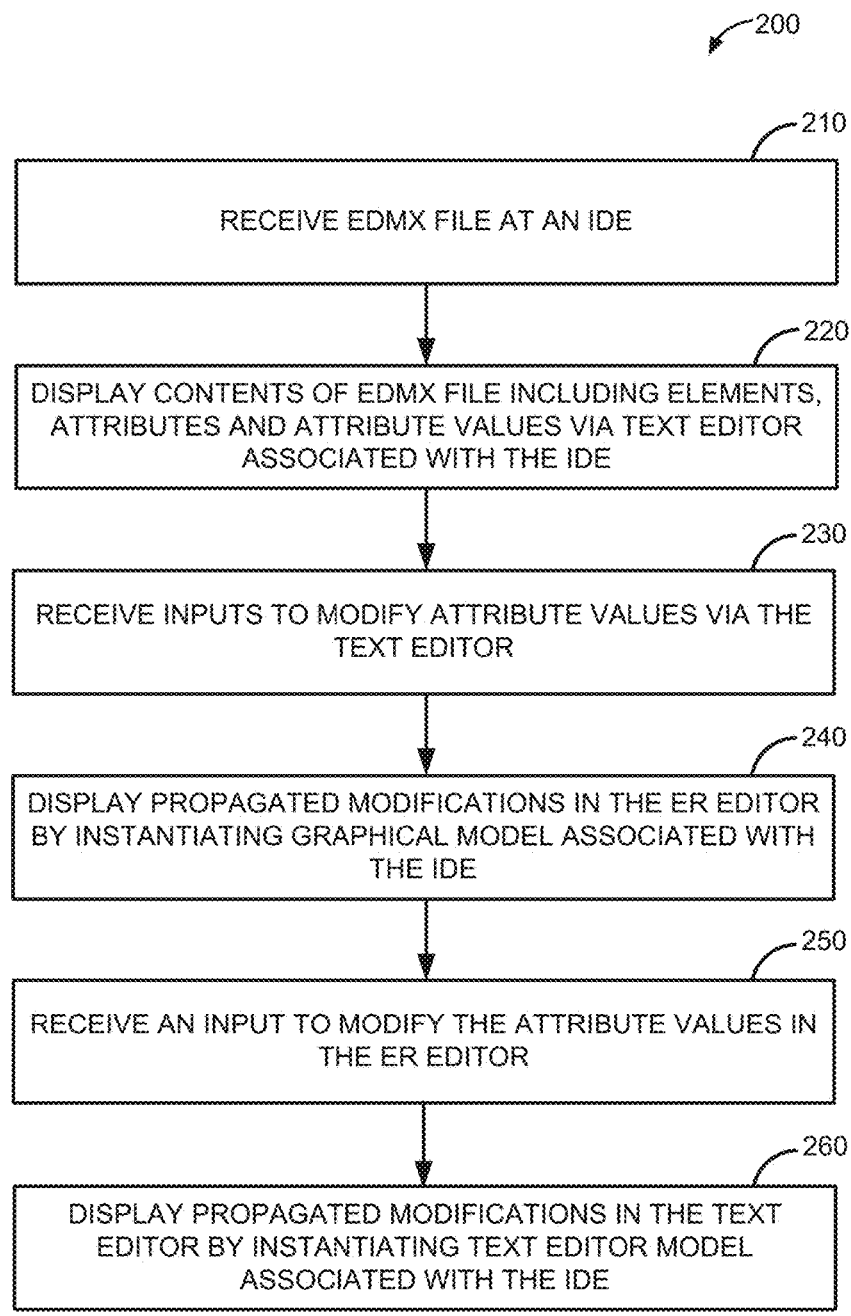
FIG. 2 is a flow diagram illustrating process to improve user experience for developing a data model, according to an embodiment.

FIG. 2 is a flow diagram illustrating process 200 to improve user experience for developing a data model, according to an embodiment. Process 200, upon execution provides a mechanism to improve user experience to develop a data model. In an embodiment, user experience to develop the data model may be improved by providing an integrated development environment (IDE). The IDE may include an integration of user interface engines, models and tools, such as a text editor viewer, a text editor model, graphical model, graphical viewer/editor, annotation editor, documentation editor, Entity-Relationship (ER) model, ER Editor, ER model viewer, etc.), that may work in conjunction (e.g., in cooperation) with each other. In response to certain operations (e.g., create new data model, edit Of modify data models, modify attributes or attribute values, etc.), the IDE may instantiate the user interface engines, models, editors (e.g., text editor, graphical editor, annotation editor, documentation editor, etc.) and tools. In an embodiment, the above editors may be instantiated at the IDE and may be rendered side-by-side via user interfaces. The editors may be arranged and rendered as user interface tabs that may be accessed by clicking on the tabs.

In an embodiment, the IDE may facilitate modeling and development of data models. By way of example, consider that the IDE may facilitate modeling and development of a data model (e.g., OData Model) based on an open data protocol (OData). For instance, OData model may include a systematic description of a business process that may be modeled as components (e.g., entities) that may be linked with each other. The linking of the components may be modeled via relationships using ER models or ER diagrams. An ER model or ER diagram may correspond to a graph showing the relationships between the entities. By way of example, consider the business process Sales Order that may include none (e.g., zero) or multiple products or items. A product or an item may be a part of multiple Sales Orders. In the above example, the sale orders and the product or items may be represented as entities. Each entity may be associated with multiple attributes and attribute values that may be linked via relationships that may be modeled and described by ER models.

By way of example, consider Jack is a software developer who is assigned a task of developing a business process. Jack may assimilate information about the business process (e.g., operational aspects, functional aspects, relationships between operational and functional aspects, etc.) and partition the business process into components. Such components may include elements (e.g., entities), attributes associated with the elements, attribute values, etc., of the business process. Jack may create a data model (e.g., an Entity Data Model (EDM)) using common schema definition language (CSDL). The CSDL may define and describe the representation of the components (e.g., elements, the attributes, the attribute values, etc.) of the business process by Extensible Markup Language (XML).

In an embodiment, the EDM created by Jack using XML may be referred to as an entity data model extensible markup language (EDMX) model or EDMX data file (e.g., EDMX file). In an embodiment, contents of the EDMX file may include descriptions of entities, relationships between entities, attributes describing the entities, attribute values, navigation information, etc, in an embodiment. Jack may instantiate the IDE and access the EDMX file. Upon creating the EDMX file, Jack may model and develop the OData model (e.g., for the business process) by accessing the EDMX file using the IDE. In an embodiment, the IDE may receive the EDMX file, at 210. Upon receiving the EDMX file, a text editor model may be instantiate at the IDE that may invoke a text editor (or text editor viewer).

In an embodiment, upon instantiating the text editor model, contents of EDMX file including the elements, attributes and attribute values are displayed via the text editor associated with IDE, at 220. Jack may consider modeling and developing an OData model by visualizing the relationships between the elements of the business process. In such a scenario, Jack may consider generating an ER model or ER diagram that may depict the relationships between the elements. In an embodiment, the ER model or ER diagram may be generated by executing a graphical model associated with the IDE. The execution of the graphical model may generate the ER model based on the relationships between the entities, the attributes and the attribute values in the EDMX file. In an embodiment, Jack may consider editing or modifying the attribute values via the text editor to study the behavior and relationships between the elements of the business process.

In an embodiment, an input to modify the attribute values is received via the text editor, at 230. Upon receiving such modifications, the text editor model associated with the IDE may determine the modifications and may instantiate the graphical model associated with the IDE. The instantiation of the graphical model may propagate the modifications (e.g., modified attributes or attribute values). In an embodiment, instantiating the graphical model may include transforming the contents of the EDMX file into a common object model (e.g., first common object model, such as JavaScript Object Notion (JSON) Object Model).

In an embodiment, the contents on the EDMX file may be transformed into common object model using a software code library (e.g., X2JS: XML to JavaScript transforming or mapping library). Subsequently, the generated common object model may be parsed by the graphical model to generate a graphical object model (e.g., GALILEI Object Model which is a unique description model for different kinds of objects, such as, documents, profiles, communities, etc.). The graphical object model may be executed by instantiating the graphical model that may generate an ER model or ER diagram. In an embodiment, the generated ER model may include the modifications corresponding to the received inputs in the text editor. The modifications are propagated and displayed in the ER editor by instantiating the graphical model associated with the IDE, at 240. In an embodiment, propagating the modifications may include updating the attributes or attribute values in the ER editor.

In an embodiment, the generated ER model or ER diagram may be rendered via a graphical viewer that may be configured to receive inputs. By way of example, consider that Jack may edit or modify the attribute values in the ER editor. In an embodiment, an input to modify the attribute values is received in the ER editor, at 250. Upon receiving such modifications, the graphical model may determine the modifications and may instantiate the text editor model associated with the IDE. The instantiation of the text editor model may propagate modifications (e.g., modified attributes or attribute values).

In an embodiment, instantiating the text editor model may include transforming the ER model into a graphical ER model. The ER graphical model may be transformed into common object model (e.g., second common object model, such as JavaScript Object Notion (JSON) Object Model). In an embodiment, the contents on the EDMX file may be transformed into common object model using a software code library X2JS: XML to JavaScript transforming Of mapping library). Subsequently, the generated common object model may be parsed by the text editor model to generate a text editor object model. The text editor object model may be executed by text editor model to instantiate the text editor. In an embodiment, the text editor may include the modifications corresponding to the received inputs in the ER model. The modifications are propagated and displayed in the text editor by instantiating the text editor model associated with the IDE, at 260. In an embodiment, propagating the modifications may include updating the attributes or attribute values in the text editor.

In an embodiment, Jack may validate the functional aspects of OData model using a test client integrated with the IDE. Jack may instantiate the test client with the OData model file to validate the functional aspects of the business process. For instance, the test client may provide simulating (e.g., behavior of components of) the business process, when deployed as a service in a business environment.

Figure 3:
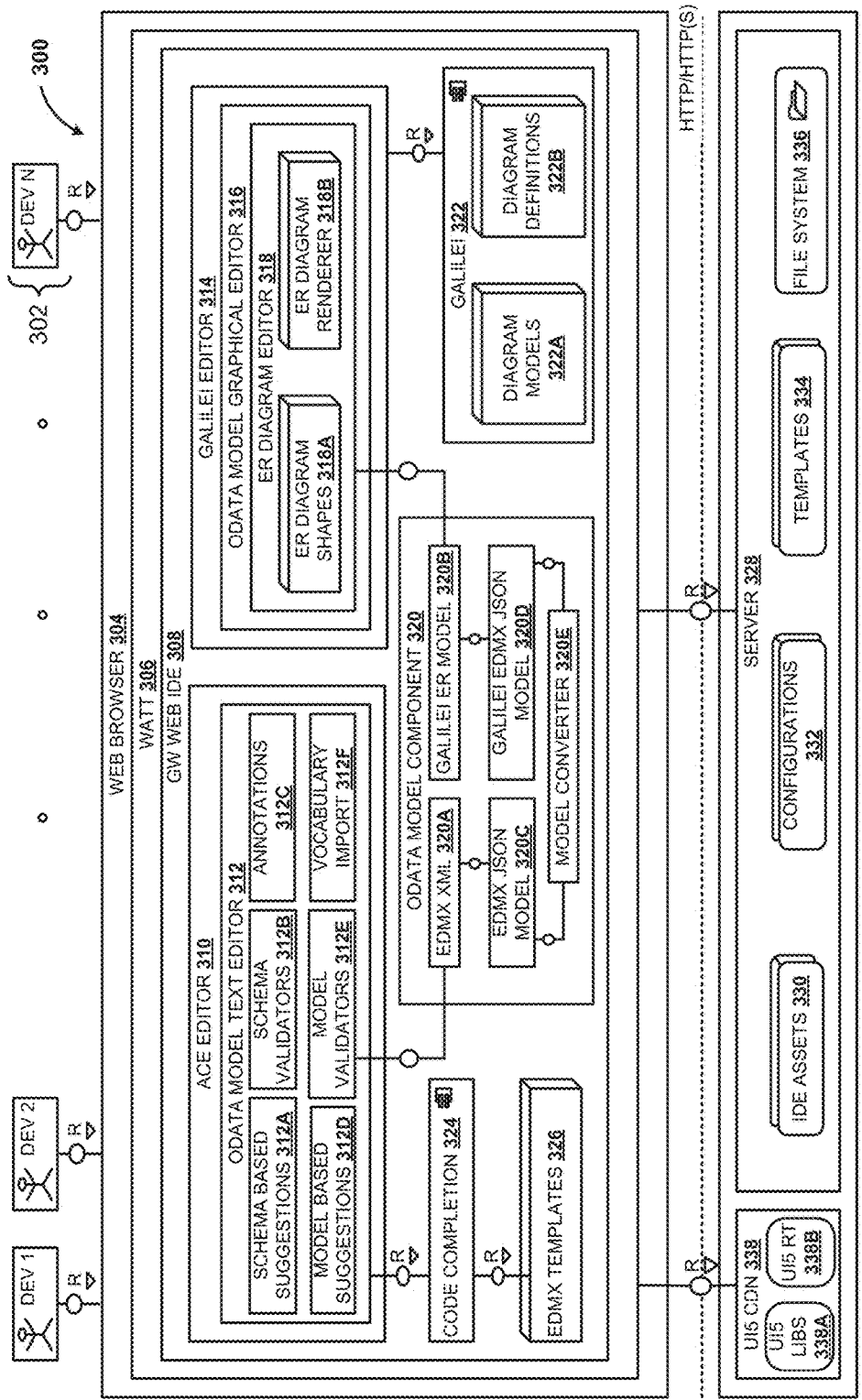
FIG. 3 is a block diagram illustrating an integrated development environment, according to an embodiment.

FIG. 3 is a block diagram illustrating integrated development environment 300, according to an embodiment. By way of illustration FIG. 3 shows IDE 300 including an integration of models, editors, tools, etc., that may improve a user experience for developing a data model. In an embodiment, IDE 300 may be deployed as a software application on a standalone system or in a distributed computing environment (e.g., cloud computing environment).

In an embodiment, IDE 300 may provide an interface for multiple developers 302 (e.g., DEV 1, DEV 2, ..., DEV N) to connect with IDE 300 via a web browser 304. The IDE 300 may include an integration of a web application tool kit (WATT) 306, gateway (GW) web IDE 308, etc. The gateway web IDE 308 may include an integration of software components such as, ACE Editor 310, Galilei Editor 314, OData. Model Component 320, "CODE COMPLETION" 324, "EDMX TEMPLATES" 326, "GALILEI" 322 including "DIAGRAM MODELS" 322A, "DIAGRAM DEFINITIONS" 322B, etc. The OData model text editor 312 may include integration of software components, software modules, etc., that may provide specific functionalities. By way of example, software components may facilitate in provisioning in web services, service-oriented architectures (SOA), etc., where the software component may be transformed by the web service into a service.

In an embodiment, the ACE editor 310 associated with OData Model text editor 312 may include an integration of software components such as a "SCHEMA BASED SUGGESTIONS" 312A, "SCHEMA VALIDATORS" 312B, "ANNOTATIONS" 312C, "MODEL BASED SUGGESTIONS" 312D, "MODEL VALIDATORS" 312E, "VOCABULARY IMPORT" 312F, etc. In an embodiment, "SCHEMA BASED SUGGESTIONS" 312A software component may provide CSDL schema suggestions based on the current position of a cursor in the text editor. The "SCHEMA VALIDATORS" 312B software component may show schema validation errors at specific lines in the text editor based on CSDL schema rules. The "ANNOTATIONS" 312C software component may provide proprietary annotation suggestions. The "MODEL BASED SUGGESTIONS" 312D software component may provide the graphical model specific suggestions based on the ER model or ER diagram that may be generated from the EDMX file, The "MODEL VALIDATORS" 312E software component may be provide validation of data models based on pre-defined rules. The "VOCABULARY IMPORT" 312F software component may be configured with definitions for specific words.

In an embodiment, the Galilei Editor 314 associated with OData Model Graphical Editor 316 may include an integration of software components "ER DIAGRAM EDITOR" 318 including , "ER DIAGRAM SHAPES" 318A, "ER DIAGRAM RENDERER" 318B, etc. The software component "ER DIAGRAM SHAPES" 318A may include semantics associated with library of shapes that may be used generate the ER diagrams. The "ER DIAGRAM RENDERER" 318B software component may provide a viewer (e.g., graphical viewer or graphical editor) or provision rendering of the ER diagram. The ER diagrams may be generated based on relationships between the elements (e.g., entities, attributes, attribute values, etc.). In an embodiment, the "ODATA MODEL COMPONENT" 320 software component may support transforming of models (e.g., EDMX file to JSON; JSON to ER Model; JSON ER Model to Graphical ER Model; and so on), The "ODATA MODEL COMPONENT" 320 includes an integration of software components, such as "EDMX XML" 320A, "GALILEI ER MODEL" 320B, "EDMX JSON MODEL" 320C, "GALILEI EDMX JSON MODEL" 320D, "MODEL CONVERTER" 320E. As explained previously, the models may be transformed based on instantiation of specific models (e.g., text editor model, graphical model, etc.).

In an embodiment, Galilei Editor 314 may work in conjunction with Galilei 322. Galilei includes software components like "DIAGRAM MODELS" 322A and "DIAGRAM DEFINITIONS" 322B. The software components of Galilei 322 may be used to generate the ER Model or ER diagrams. Galilei Editor 314 provides a framework of custom shapes and geometric shapes that may be used to generate the ER Model or ER diagrams. In an embodiment, the "CODE COMPLETION" 324 software component may provide suggestions for automatically completing code snippets when specific keys on the keyboard are pressed. The "EDMX TEMPLATES" 326 software component may include pre-defined templates (e.g., data structures) associated with the CSDL schema.

In an embodiment, IDE 300 may communicate with server 328 (e.g., Orion Server) over a network using standard web protocol (e.g., "HTTP or HTTPS"). The server 328 may host components such as, "IDE ASSETS" 330, "CONFIGURATIONS" 332, "TEMPLATES" 334, "FILE SYSTEM" 336, etc. The above components may provide a platform for developing additional features that may be added to the IDE; managing and maintaining software developer's workspace, etc. In an embodiment, the UI5 CDN 338 includes UI5 LIBS 338A and UI5 RT 338B, which provides controls for managing user interface templates. An end user may build interactive web-based applications using the UI5 CDN 338 software component.

In an embodiment, IDE 300 may also include an integration of a lest client (not shown) (e.g., mock service for OData Model) that may be used to preview sample data associated with OData model. The test client may be instantiated from the IDE when the user wants to preview sample data (e.g., when the OData model is created). In an embodiment, the IDE may also include an integration of editors, such as annotation editor, documentation editor, etc, (not shown). The annotation editor (and the annotation editor model) may be configured to determined customized annotations defined in the OData model (e.g., EDMX data file). The annotation editor may be configured to extract annotations defined in the OData model and work in conjunction with the other editors and models (e.g., graphical editor, text editor, etc.). In an embodiment, when the annotation definitions are modified, such modifications may be propagated across the editors (e.g., text editor, graphical editor, etc.) by instantiating the respective models (e.g., text editor model, graphical model, documentation model, annotation model, etc.).

In an embodiment, the documentation editor may be configured to determine the documentation tags associated with the elements in the EDMX file. The documentation editor (and the documentation editor model) may be configured to determine and extract documentation information associated with the elements in the EDMX file (e.g., OData Model). In an embodiment, when the information in the documentation associated with the elements are modified, such modifications may be propagated across the editors (e.g., text editor, graphical editor, etc.) by instantiating the respective models (e.g., text editor model, graphical model, etc.).

Figure 4:
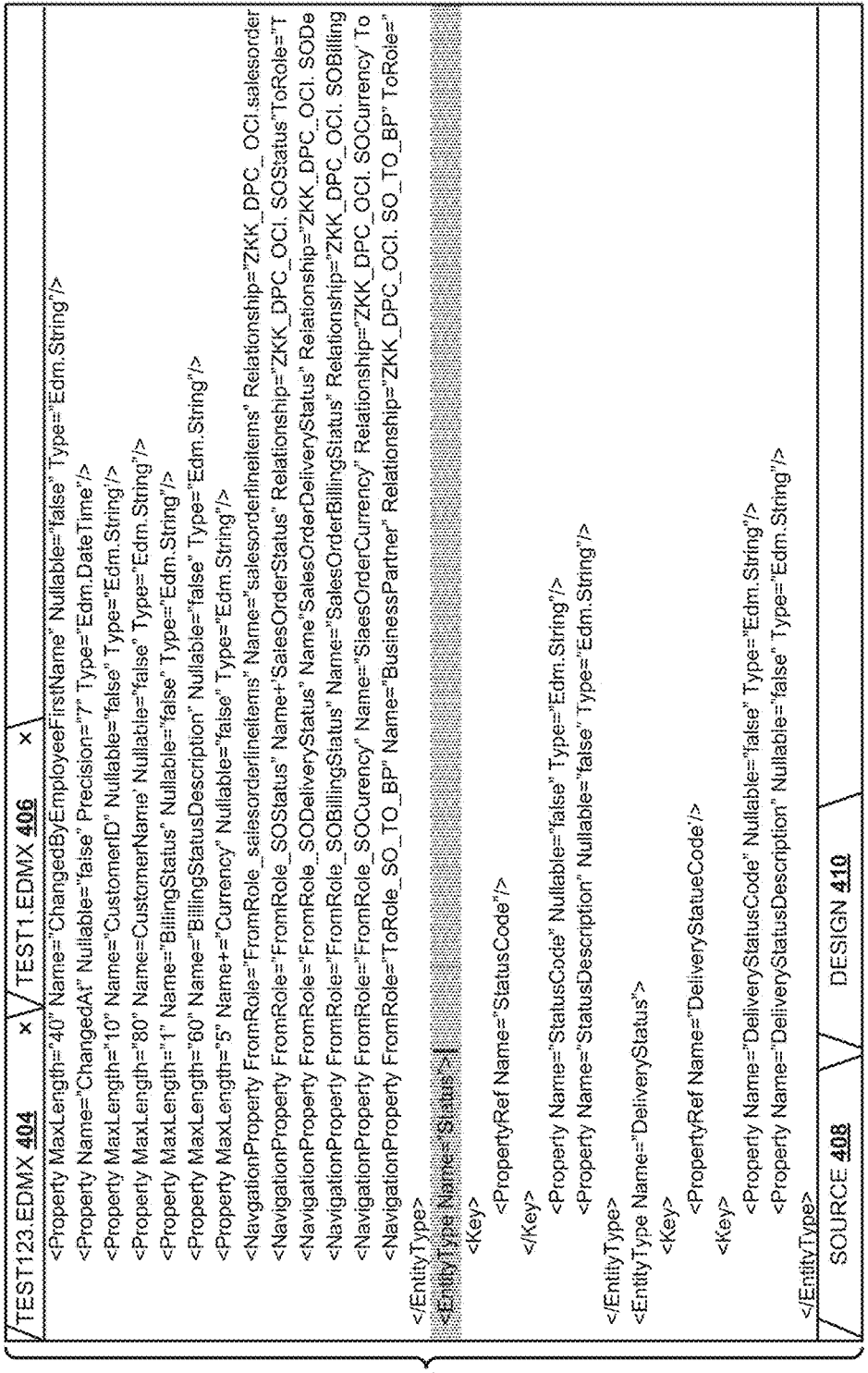
FIG. 4 is a block diagram illustrating a text editor associated with the IDE, according to an embodiment.

FIG. 4 is a block diagram illustrating text editor 402 associated with the IDE, according to an embodiment. By way of illustration, FIG. 4 shows a user interface rendering contents of EDMX file (e.g., TEST123.EDMX 404 or TEST1.EDMX 406) in text editor 402. When an EDMX file is accessed using the IDE, the text editor model instantiates text editor 402 and renders the contents of the EDMX file in text editor 402. As shown in FIG. 4, contents of the EDMX file includes elements, (e.g., "ENTITY TYPE"), attributes (e.g., "PropertyRefName"), attribute values (e.g., "StatusCode"), navigation information (e.g., "NavigationProperty"), etc. The text editor 402 shows the contents of the EDMX file when the tab "SOURCE" 408 is clicked on the user interface. When "DESIGN" 410 tab is clicked, the graphical model associated with the IDE generates ER Model or ER diagram corresponding to the contents of the EDMX file. As explained previously, the ER diagram shows the relationship between the elements, the attributes and the attribute values. In an embodiment, text editor 402 may be configured to receive inputs to modify the attributes or attribute values.

Figure 5:
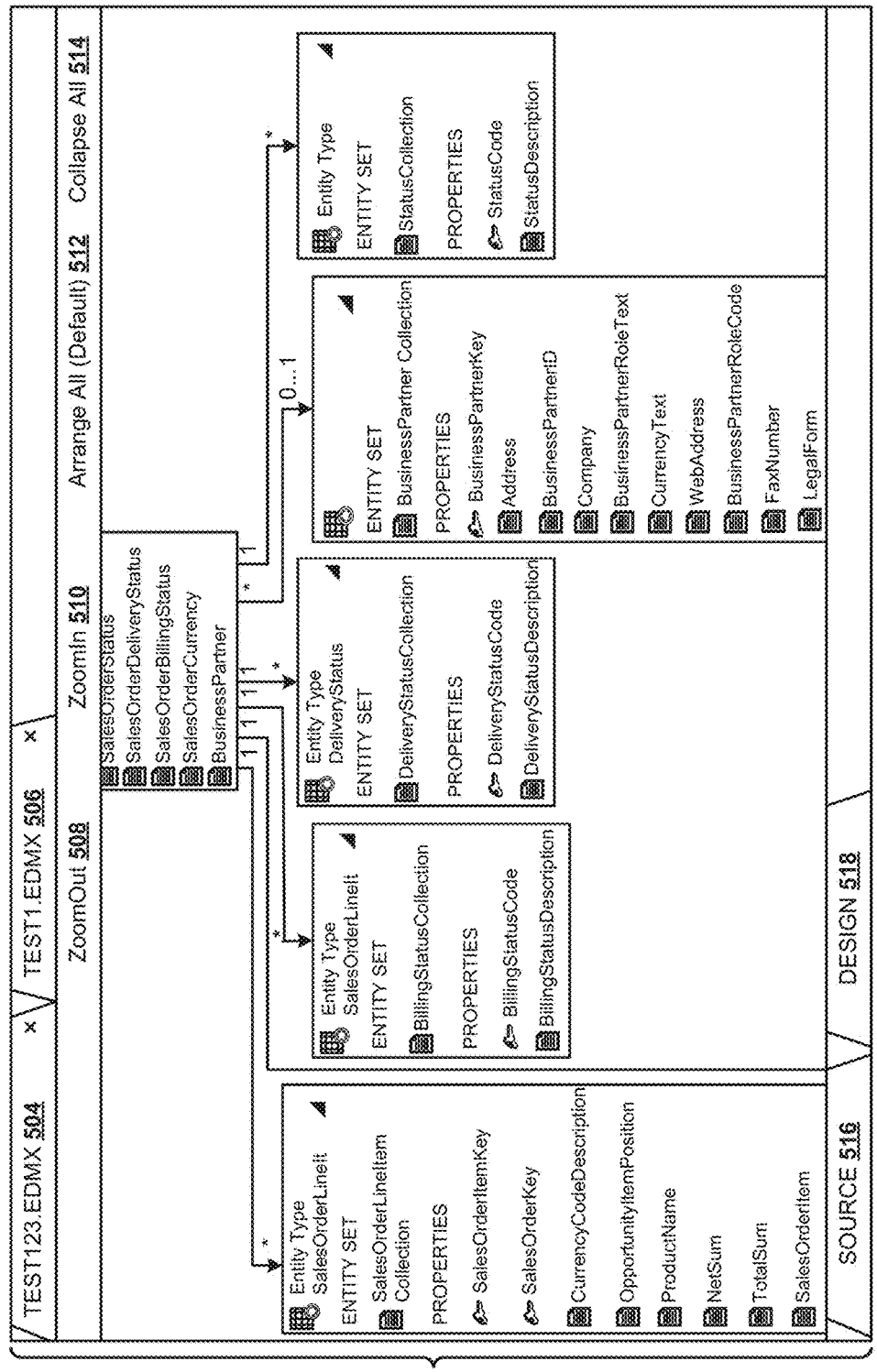
FIG. 5 is a block diagram illustrating a graphical viewer associated with the IDE, according to an embodiment.

FIG. 5 is a block diagram illustrating graphical viewer 502 associated with the IDE, according to an embodiment. By way of illustration, FIG. 5 shows a user interface rendering an ER model or ER diagram in graphical viewer 502. The ER model or ER diagram is generated by instantiating the graphical model associated with the IDE and corresponds to the contents of EDMX file (e.g., TEST123.EDMX 504 or TEST1.EDMX 506). FIG. 5 shows the relationships between the elements (e.g., entities), attributes and the attribute values. The graphical viewer 502 shows the contents of the EDMX file when the tab "DESIGN" 518 is clicked on the user interface. When the tab "SOURCE" 516 is clicked, the text editor model associated with the IDE generates and renders the text editor corresponding to the contents of the ER Model or ER diagram. As explained previously, the ER diagram shows the relationship between the elements, the attributes and the attribute values. In an embodiment, the graphical viewer 502 may be configured to receive inputs to modify the attributes or attribute values (e.g., graphical viewer may also be referred to as graphical editor that may work in cooperation with the graphical model). Additionally, the graphical viewer 502 includes standard functionalities, like ZoomOut 508, ZoomIn 510, Arrange All (Default) 512, Collapse All 514, etc., to execute the respective operations associated with the standard functionalities.

Figure 6:
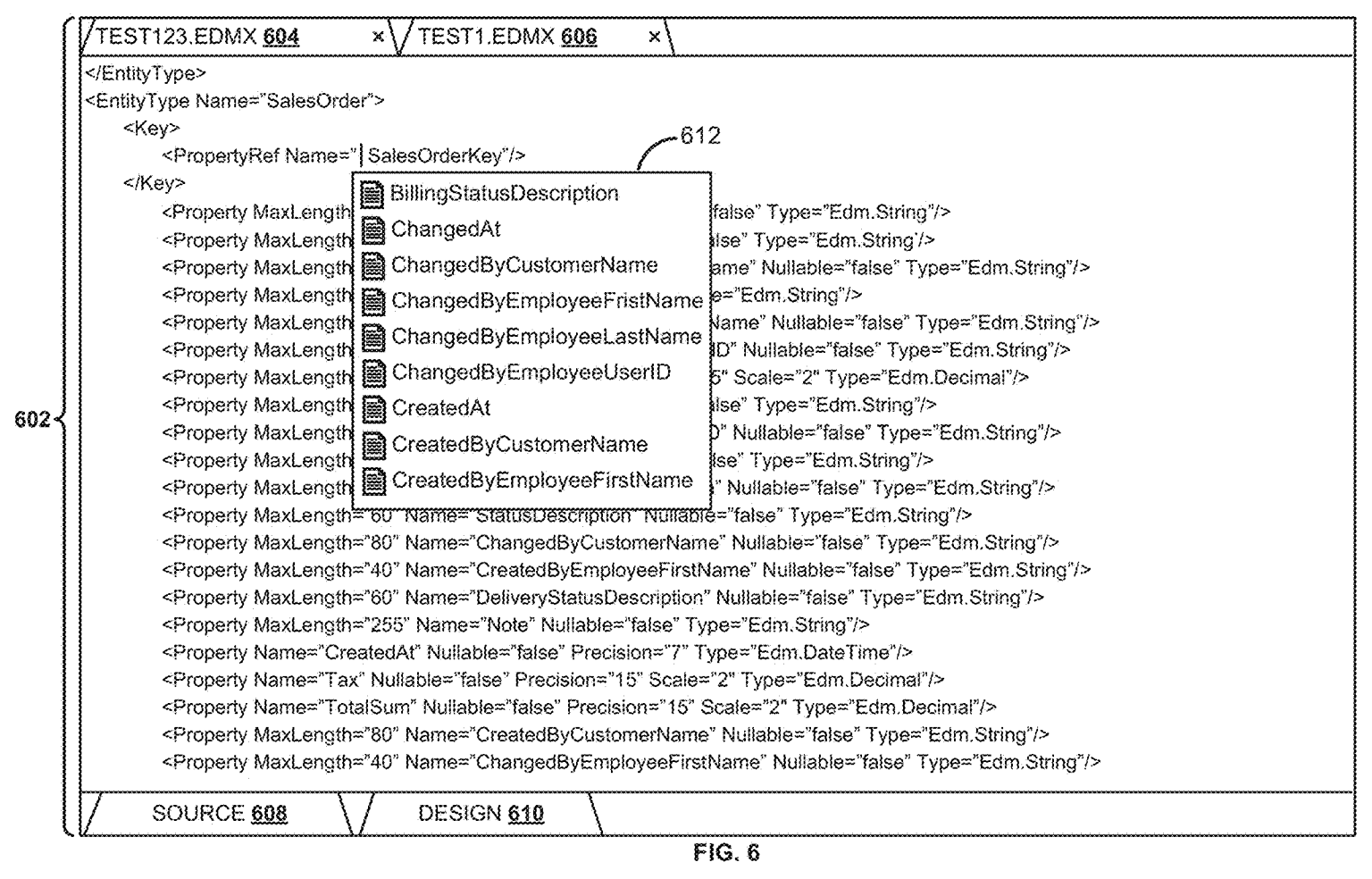

FIG. 6 is a block diagram illustrating text editor 602 associated with the IDE, according to an embodiment. By way of illustration, FIG. 6 shows a user interface rendering contents of EDMX file (e.g., TEST123.EDMX 404 or TEST1.EDMX 406) in text editor 602. As shown in FIG. 6, contents of the EDMX file includes elements, (e.g., "ENTITY TYPE"), attributes (e.g., "PropertyRefName'"), attribute values (e.g., "StatusCode"), navigation information (e.g., "NavigationProperty"), etc. The text editor 602 shows the contents of the EDMX file when the tab "SOURCE" 608 is clicked on the user interface. When "DESIGN" 610 tab is clicked, the graphical model associated with the IDE generates ER Model or ER diagram corresponding to the contents of the EDMX file. In an embodiment, FIG. 6 shows feature like intelligent code completion (e.g., IntelliSense) based on a determination of context of programming environments. As shown, text box 612 provides suggestions for completing the code. Based on the contents of the EDMX file (e.g., TEST123.EDMX 604 or TEST1.EDMX 606), the text editor model associated with the IDE may determine the entities and the associated attributes. Based on such determination, intelligent suggestions may be provided for code completion.

Figure 7:
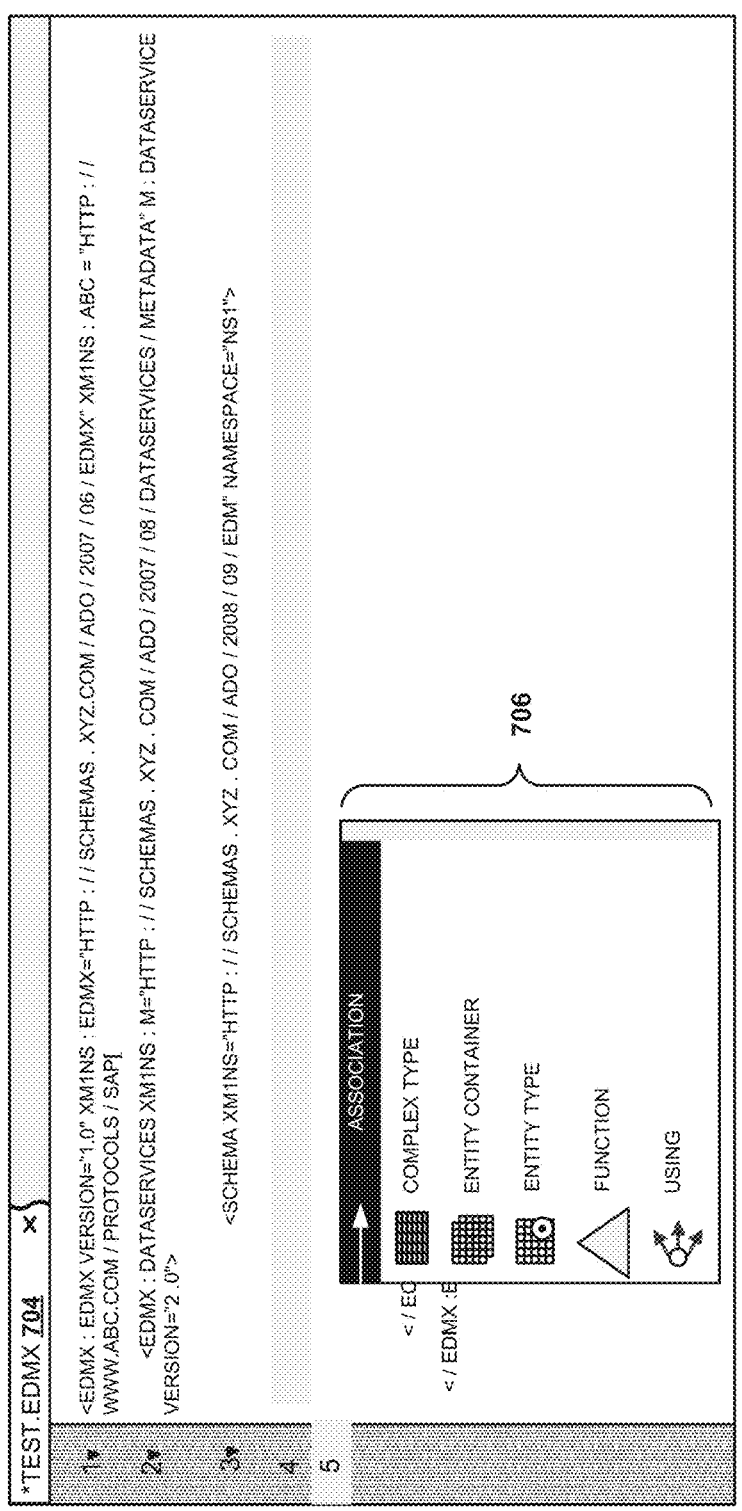
FIG. 7 is a block diagram illustrating a text editor associated with the IDE, according to an embodiment.

FIG. 7 is a block diagram illustrating text editor 702 associated with the IDE, according to an embodiment. By way of illustration, FIG. 7 shows a user interface including text editor 702 for creating an EDMX file (e.g., TEST.EDMX. 704). In an embodiment, the features (e.g., code completion, schema based suggestions, etc.) embedded as software components with the IDE may prompt the user when specific keys are pressed on a keyboard. By way of illustration, FIG. 7 shows a user interface element including text box 706 that may be used to define or describe the elements in TEST.EDMX file 704. Based on the context, the user may be prompted (e.g., with text box 706) to select a functionality and an associated description (e.g., association, complex type, entity container, entity type, function, etc.). Based on the user selection, the corresponding functionality and description including any programming code (e.g., XML tags, definitions, navigation, etc.) may be embedded in the EDMX file.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
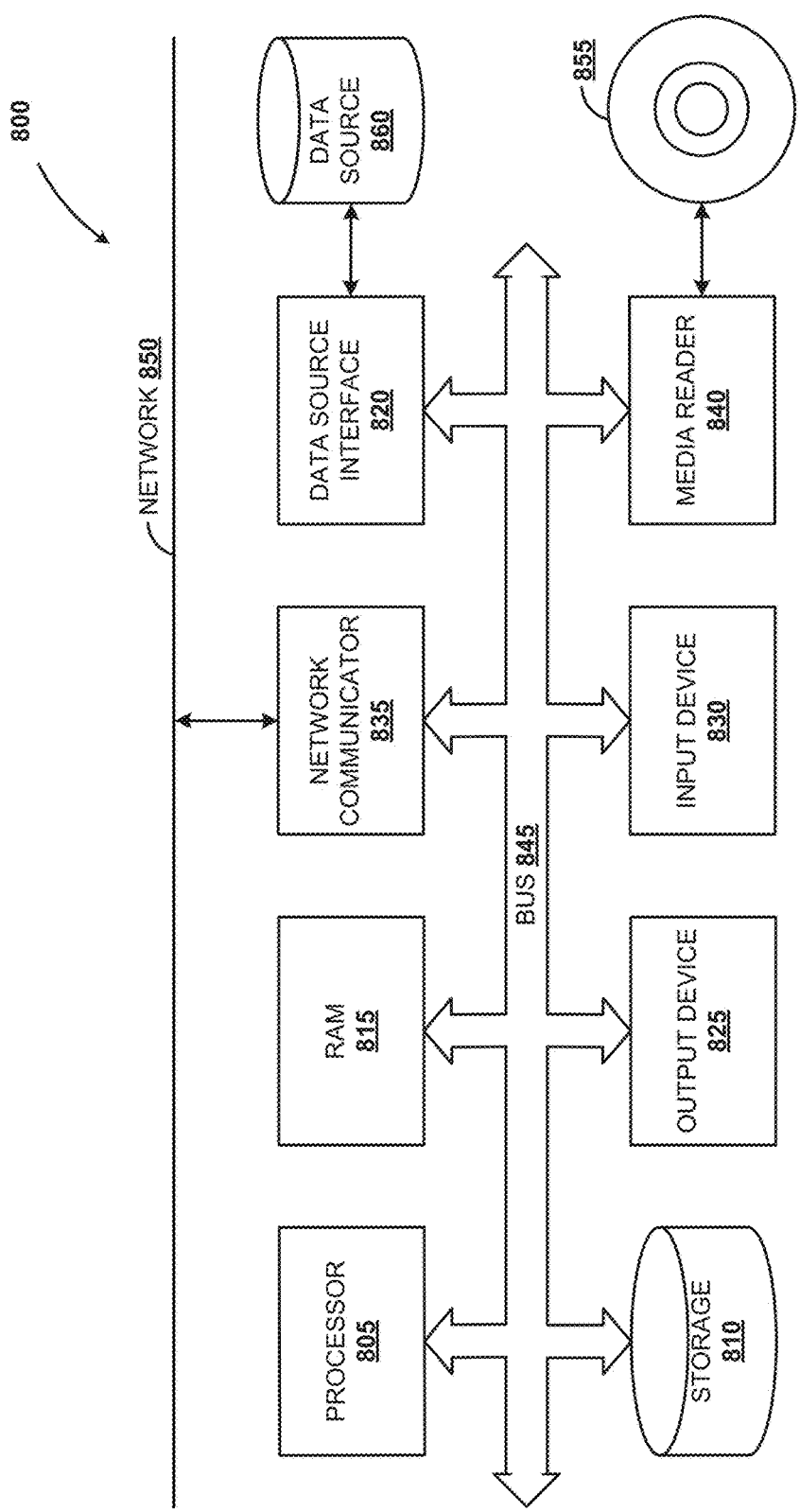
FIG. 8 is a block diagram of a computer system, according to an embodiment.

FIG. 8 is a block diagram of an exemplary computer system 800, according to an embodiment. Computer system 800 includes processor 805 that executes software instructions or code stored on computer readable storage medium 855 to perform the above-illustrated methods. Processor 805 can include a plurality of cores. Computer system 800 includes media reader 840 to read the instructions from computer readable storage medium 855 and store the instructions in storage 810 or in random access memory (RAM) 815. Storage 810 provides a large space for keeping static data where at least some instructions could be stored for later execution. According to some embodiments, such as some in-memory computing system embodiments, RAM 815 can have sufficient storage capacity to store much of the data required for processing in RAM 815 instead of in storage 810. In some embodiments, all of the data required for processing may be stored in RAM 815. The stored instructions may be further compiled to generate other representations of the instructions and dynamically stored in RAM 815. Processor 805 reads instructions from RAM 815 and performs actions as instructed. According to one embodiment, computer system 800 further includes output device 825 (e.g., a display) to provide at least some of the results of the execution as output including, but not limited to, visual information to users and input device 830 to provide a user or another device with means for entering data and/or otherwise interact with computer system 800. Each of these output devices 825 and input devices 830 could be joined by one or more additional peripherals to further expand the capabilities of computer system 800. Network communicator 835 may be provided to connect computer system 800 to network 850 and in turn to other devices connected to network 850 including other clients, servers, data stores, and interfaces, for instance. The modules of computer system 800 are interconnected via bus 845. Computer system 800 includes a data source interface 820 to access data source 860. Data source 860 can be accessed via one or more abstraction layers implemented in hardware or software. For example, data source 860 may be accessed by network 850. In some embodiments data source 860 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored of otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein in addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to develop a data model, the computer implemented method comprising:
   displaying contents of a data file as a text-based data object via a text editor interface of an integrated development environment (IDE), the displayed text-based data object including text values of one or more elements, one or more attributes, and one or more attribute values; and
   in response to detecting an input modifying the one or more attribute values of the text-based data object via the text editor interface, transforming the text-based data object into a graphical model including the one or more attributes modified via the text editor interface and visually representing relationships between the modified one or more attribute values, the one or more attributes, and the one or more elements, and displaying the graphical model via a graphical editor interface of the IDE,
   wherein the displaying the graphical model comprises simultaneously displaying the graphical editor interface and the text editor interface within a window of the IDE.

2. The computer implemented method of claim 1, further comprising, in response to detecting an input modifying the one or more attribute values of the graphical model via the graphical editor interface, transforming the graphical model into a text editor model including the one or more attribute values modified via the graphical editor interface, and displaying the text editor model via the text editor interface.

3. The computer implemented method of claim 2, wherein the transforming the graphical model into the text editor model comprises propagating the one or more attribute values modified via the graphical editor interface within the text editor interface.

4. The computer implemented method of claim 2, wherein the text editor model is instantiated by the graphical model in response to a determination of modifications in the one or more attribute values in the graphical editor interface.

5. The computer implemented method of claim 1, wherein the graphical model is instantiated from the text-based data object in response to a determination of modifications in the one or more attribute values in the text editor interface.

6. The computer implemented method of claim 1, wherein the transforming comprises:
   transforming contents of an entity data model extensible markup language (EDMX) file into a first common object model;
   parsing the first common object model by the graphical model to generate a graphical object model; and
   based on an execution of the graphical object model, generating an entity-relationship (ER) model including the one or more attribute values modified via the text editor interface and the relationships between the modified one or more attribute values, the one or more attributes, and the one or more elements.

7. The computer implemented method of claim 1, wherein the transforming the graphical model into the text editor model comprises:
   transforming an ER model to a second common object model;
   parsing the second common object model by the text editor model to generate a text editor object model; and
   based on an execution of the text editor object model, instantiating the text editor interface to include the modified one or more attribute values.

8. The computer implemented method of claim 1, further comprising: based on an execution of the graphical model, generating an ER model including the one or more elements, the one or more attributes and the one or more attribute values, wherein the one or more attributes associated with the one or more elements.

9. The computer implemented method of claim 1, wherein the modifications to the one or more attributes of the data objects input via the text editor interface are initially propagated by launching the graphical model via the graphical editor interface and visually displaying the modifications within the graphical model.

10. A computer system to develop a data model, comprising:
    a processor; and
    one or more memory devices communicatively coupled with the processor and storing instructions that when executed cause the processor to:
       display contents of a data file as a text-based data object via a text editor interface of an integrated development environment (IDE), the displayed text-based data object including text values of one or more elements, one or more attributes, and one or more attribute values; and
       in response to detecting an input modifying the one or more attribute values of the text-based data object via the text editor interface, transform the text-based data object into a graphical model including the one or more attributes modified via the text editor interface and visually representing relationships between the modified one or more attribute values, the one or more attributes, and the one or more elements, and displaying the graphical model via a graphical editor interface of the IDE,
       wherein the displaying of the graphical model comprises simultaneously displaying the graphical editor interface and the text editor interface within a window of the IDE.

11. The computer system of claim 10, wherein the instructions further cause the processor to, in response to detecting an input modifying the one or more attribute values of the graphical model via the graphical editor interface, transform the graphical model into a text editor model including the one or more attribute values modified via the graphical editor interface, and display the text editor model via the text editor interface.

12. The computer system of claim 11, wherein the transforming the graphical model into the text editor model comprises propagating the one or more attribute values modified via the graphical editor interface within the text editor interface.

13. The computer system of claim 11, wherein the transforming the graphical model into the text editor model comprises:
    transforming an ER model to a second common object model;

parsing the second common object model by the text editor model to generate a text editor object model; and
based on an execution of the text editor object model, instantiate the text editor interface to include the modified one or more attribute values.

14. The computer system of claim 10, wherein the transforming comprises:
transforming contents of an entity data model extensible markup language (EDMX) file into a first common object model;
parsing the first common object model by the graphical model to generate a graphical object model; and
based on an execution of the graphical object model, generate an entity-relationship (ER) model including the one or more attribute values modified via the text editor interface and the relationships between the modified one or more attribute values, the one or more attributes, and the one or more elements.

15. The computer system of claim 10, further comprising: based on an execution of the graphical model, generating an ER model including the one or more elements, the one or more attributes and the one or more attribute values, wherein the one or more attributes associated with the one or more elements.

16. A non-transitory computer readable storage medium tangibly storing instructions, which when executed by a computer, cause the computer to execute operations, comprising:
display contents of a data file as a text-based data object via a text editor interface of an integrated development environment (IDE), the displayed text-based data object including text values of one or more elements, one or more attributes, and one or more attribute values; and
in response to detecting an input modifying the one or more attribute values of the text-based data object via the text editor interface, transform the text-based data object into a graphical model including the one or more attributes modified via the text editor interface and visually representing relationships between the modified one or more attribute values, the one or more attributes, and the one or more elements, based on the inputs received in the text editor interface, and displaying the graphical model via a graphical editor interface of the IDE,
wherein the displaying of the graphical model comprises simultaneously displaying the graphical editor interface and the text editor interface within a window of the IDE.

17. The non-transitory computer readable storage medium of claim 16, wherein the instructions further cause the computer to, in response to detecting an input modifying the one or more attribute values of the graphical model via the graphical editor interface, transform the graphical model into a text editor model including the one or more attribute values modified via the graphical editor interface, and display the text editor model via the text editor interface.

18. The non-transitory computer readable storage medium of claim 17, wherein the transforming the graphical model into the text editor model comprises propagating the one or more attribute values modified via the graphical editor interface within the text editor interface.

19. The non-transitory computer readable storage medium of claim 17, wherein the transforming the graphical model into the text editor model comprises:
transforming an ER model to a second common object model;
parsing the second common object model by the text editor model to generate a text editor object model; and
based on an execution of the text editor object model, instantiate the text editor interface to include the modified one or more attribute values.

20. The non-transitory computer readable storage medium of claim 16, wherein the transforming comprises:
transforming contents of an entity data model extensible markup language (EDMX) file into a first common object model;
parsing the first common object model by the graphical model to generate a graphical object model; and
based on an execution of the graphical object model, generate an entity-relationship model including the one or more attribute values modified via the text editor interface and the relationships between the modified one or more attribute values, the one or more attributes, and the one or more elements.

* * * * *